3,322,788
SULPHONYLIMINO-DITHIOCARBONIC ACID ESTERS AND A PROCESS FOR THEIR PRODUCTION
Rudolf Gompper, Stuttgart, Richard Wegler and Karlfried Dickoré, Leverkusen, and Wolfgang Hägele, Magstadt, Kreis Goppingen, Germany, assignors to Farbenfabriken Bayer Aktiengesellschaft, Leverkusen, Germany, a German corporation
No Drawing. Filed Aug. 7, 1963, Ser. No. 300,688
Claims priority, application Germany, Sept. 14, 1962, F 37,808
21 Claims. (Cl. 260—327)

This invention relates to new sulphonylimino-dithiocarbonic acid esters of the general formula

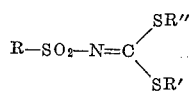

in which R represents an organic radical, for example, an aliphatic or aromatic group, or an amino group which may or may not be substituted, R' represents an alkyl or aralkyl group and R" represents a hydrogen atom or an alkyl or aralkyl group.

A further object of this invention is a process for producing these sulphonylimino-dithiocarbonic acid esters. In this process, sulphonamides are treated first with carbon disulphide in the presence of bases and then with alkylating agents.

Sulphonylimino-dithiocarbonic acid esters have not hitherto been described in the literature.

To prepare the sulphonylimino-dithiocarboxylic acid ester in accordance with the invention, one mol of a primary sulphonamide, in the form of its alkali metal or amine salt, is reacted in a suitable solvent, at temperatures from 0 to 50° C. and preferably from 20 to 30° C., with one mol of carbon disulphide to form the salt of the corresponding N-sulphonyl-dithiocarbamic acid which is then alkylated, either directly with one mol of an alkylating agent to form the monoester of sulphonyliminodithiocarboxylic acid or, after addition of another mol of a base and two mols of an alkylating agent, to form the sulphonylimino-dithio-carboxylic acid diester.

Suitable solvents for this reaction are, for example, acetonitrile, benzene, toluene, chlorobenzene, dimethylformamide, dimethylsulphoxide, diethylether, dioxane or tetrahydrofurane; alcohols are less suitable because of the formation of xanthogenates under the reaction conditions. Dimethylformamide is a particularly suitable solvent because the addition of carbon disulphide to the sulphonamide ion takes place particularly rapidly in this solvent at low temperatures. The temperature used in the subsequent alkylating reaction depends upon the reactivity of the alkylating agent. Preferably temperatures between 20 and 150° C. are used. Suitable bases are alkali metal hydroxides or alkaline earth metal hydroxides or tertiary organic bases. It is particularly advantageous to work with concentrated sodium hydroxide. Alkyl sulphates, alkyl halides and aralkyl halides as, for instance, dimethylsulphate, diethylsulphate, ethylbromide, n-butylbromide, benzylchloride, 4-chlorobenzylchloride, ethylene bromide, chloroacetic acid ethyl ester and chloroacetone are advantageously used as alkylating agents. Suitable sulphonamides are, for example, methane-sulphonamide, N,N-dimethylamino sulphonamide, N-acetyl-sulphonylamide, benzene sulphamide, p-chlorobenzene sulphamide and p-toluene-sulphonamide.

Sulfonylimino-dithiocarbonic acid esters are valuable intermediates for the production of sulfonylureas, which are important as antidiabetics. The preparation of antidiabetic sulfonylureas is exemplified by the following reaction scheme:

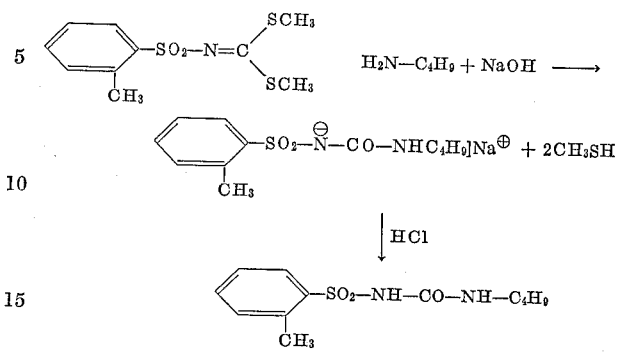

20 cc. of n-butylamine are added to a solution of 55 g. of p-toluenesulfonylimino-dithiocarbonic acid dimethylester (Example 23) in 200 cc. of dioxane. The mixture is stirred for another 2 hours at room temperature. 40 cc. of 10 N sodium hydroxide and 100 cc. of water are added and the mixture is refluxed for 4 hours. After dilution with 1 l. of water and acidification with hydrochloric acid 44 g. of crystallized N-(o-toluenesulfonyl)-N'-butylurea are filtered off, which melt at 162–163° C.

Example 1

20 ml. of 10 N-sodium hydroxide solution are added, at room temperature with stirring, to a solution of 31.4 g. of benzene sulphonamide in 100 ml. of dimethylformamide, and 12 ml. of carbon disulphide are then added dropwise at 20 to 30° C., the mixture being cooled from time to time. The sodium salt of the sulphonamide, which is at first precipitated, soon dissolves giving a reddish brown solution. The mixture is stirred for a further 15 minutes at room temperature and another 20 ml. of 10 N-sodium hydroxide solution are added dropwise. 55 g. of dimethyl sulphate are added dropwise, without cooling, to the resulting solution of the disodium salt of N-benzene-sulphonyl-dithiocarbamic acid. Methylation proceeds exothermically and the solution loses its color. After stirring for two hours at room temperature, the precipitate is separated by suction filtration at −10° C. and washed with water and a small quantity of methanol, giving 33 g. of a compound of formula:

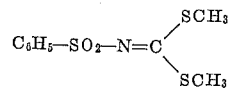

which crystallizes as colorless needles M.P. 111° C. from methanol.

Example 2

A solution of the disodium salt of N-benzenesulphonyl-dithiocarbamic acid is prepared as in Example 1 from 31.4 g. of benzene sulphonamide and is alkylated with 68 g. of diethyl sulphate. The reaction mixture is stirred for one hour at 100° C. and the reaction product is precipitated with water. 37 g. of a compound M.P. 90° C of formula:

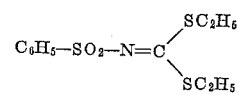

are obtained and recrystallized from ethanol.

Example 3

60 g. of n-butylbromide are added to a solution of the disodium salt of N-benzenesulphonyl-dithiocarbamic acid, prepared from 31.4 g. of benzenesulphonamide according to Example 1, the mixture is stirred for 3 hours at 100° C. and then poured into 1.5 litres of water. The oil which separates out is taken up in chloroform and washed with water. The oily residue after evaporation of the chloroform is heated at 200° C./2 mm. Hg, some distillation occurs and the residual oil is decolorized with animal charcoal. 35 g. of an almost colorless oil of the formula:

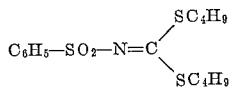

are obtained:

Example 4

56 g. of benzyl chloride are added dropwise to the solution of the disodium salt of N-benzenesulphenyl-dithiocarbamic acid prepared from 31.4 g. of benzenesulphonamide according to Example 1, and the mixture is stirred for 3 hours at 100° C. It is then stirred into 1.5 litres of water and the aqueous solution is decanted from the oily reaction product which separates. The product crystallizes when triturated with a small quantity of methanol. It is dried on a porous plate and 53 g. of a compound M.P. 92° C. of the formula:

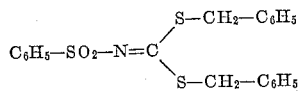

are obtained and recrystallized from ethanol.

Example 5

A solution of 71 g. of 4-chlorobenzyl chloride in 100 ml. of dimethylformamide is added dropwise to a solution of the disodium salt of N-benzenesulphenyl-dithiocarbamic acid prepared from 31.4 g. of benzene sulphonamide according to Example 1. The mixture is stirred for 8 hours at 100° C. and poured into 1.5 litres of water. The precipitate which is thereby formed gradually crystallizes. It is removed by suction filtration, and washed with water and methanol. 30 g. of a compound of the formula:

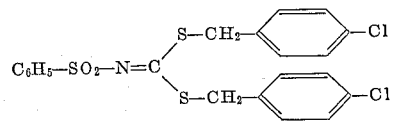

are obtained. After recrystallization from ethanol this product crystallizes either as colorless platelets, M.P. 112° C. (labile form) or in needles, M.P. 124° C. (stable form).

Example 6

100 ml. of 10 N-sodium hydroxide solution are first added dropwise to a solution of 216 g. of N-acetylsulphanilamide in 600 ml. dimethylformamide and 60 ml. of carbon disulphide are then added at 20 to 30° C., the reaction vessel being cooled externally from time to time. A further 100 ml. of 10 N-sodium hydroxide solution are added dropwise after 15 minutes, and then 300 g. of dimehtyl sulphate without cooling. The temperature rises spontaneously to 80° C. The reaction mixture is kept for another 2 hours at 100° C. and is then stirred into 3 litres of water. The aqueous phase is decanted from the oily reaction product and the residue is stirred with 1 litre of methanol so that it crystallizes 138 g. of a compound of the formula:

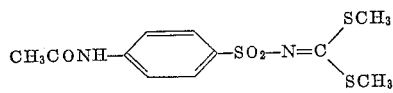

melting point 168° C., are obtained.

Example 7

200 ml. of 10 N-sodium hydroxide solution are added dropwise to a solution of 24.8 g. of N,N-dimethylaminosulphonamide in 100 ml. of dimethylformamide and 12 ml. of carbon disulphide are then added dropwise at 20 to 30° C. External cooling is applied from time to time during the addition of the carbon disulphide, and the mixture is stirred for 15 minutes at room temperature. After adding a further 20 ml. of 10 N-sodium hydroxide solution, 56 g. of benzyl chloride are added dropwise and the mixture is stirred for another 3 hours at 100° C. and poured into 1.5 litres of water. The reaction product partly crystallizes when left to stand overnight. The crystals are filtered off by suction and washed with water. Yield: 33.0 g. of a compound of the formula

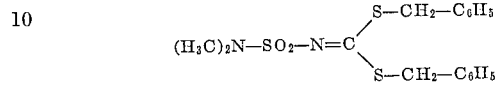

27 g. of colorless crystals M.P. 86° C. are obtained after recrystallization from a small quantity of methanol.

Example 8

A solution of 24.8 g. of N,N-dimethylaminosulphonamide, 20 ml. of 10 N-sodium hydroxide, 12 ml. of carbon disulphide and 20 ml. of 10 N-sodium hydroxide in 100 ml. of dimethylformamide, prepared according to Example 7, is alkylated with a solution of 71 g. of 4-chlorobenzyl chloride in 100 ml. of dimethylformamide under the same conditions as were used in Example 7. 49 g. of a compound of the formula

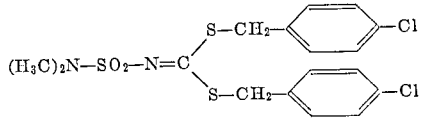

are obtained. This compound forms colorless needles M.P. 141° C. when decolorized with animal charcoal and recrystallized from benzene/petroleum ether.

Example 9

28.5 g. of methanesulphonamide in 100 ml. of dimethylformamide are reacted in the usual manner with 30 ml. of 10 N-sodium hydroxide, 18 ml. of $CS_2$ and 30 ml. of 10 N-sodium hydroxide at 20 to 30° C. and the product is then alkylated with 83 g. of dimethylsulphate. The reaction product is precipitated with water and washed with water. 21 g. of a compound of the formula:

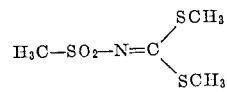

are obtained M.P. 88–89° C. (from a small quantity of methanol).

Example 10

83 g. of dimethylsulphate are added dropwise to a solution, prepared in the usual manner, of 37.2 g. of N,N-dimethylaminosulphonamide in 100 ml. of dimethylformamide, 30 ml. of 10 N-sodium hydroxide, 18 ml. of carbon disulphide and 30 ml. of 10 N-sodium hydroxide. The mixture is poured into 1.5 litres of water and the reaction product which crystallizes after some time is filtered off by suction. 22 g. of a compound of the formula:

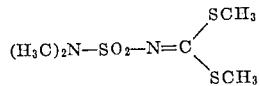

are obtained in the form of colorless needles M.P. 58 to 60° C. by recrystallization from a small quantity of methanol.

Example 11

24 cc. of sodium hydroxide (16 g. of NaOH in 20 cc. water) and 13 cc. of carbon disulphide are added in portions to a solution of 34.3 g. of p-toluenesulphonamide in 150 cc. of dimethylsulphoxide. 51 g. of dimethyl sulphate are then added. When the product is isolated by pouring it into water, 41.5 g. of N-(p-toluenesulphonyl)-imino-dithiocarbonic acid-dimethyl ester M.P. 109° C. are obtained.

Example 12

24 cc of sodium hydroxide (16 g. NaOH in 20 cc. water) and 13 cc. of carbon disulphide are added in portions to a solution of 31.5 g. of benzene sulphonamide in 200 cc. of N,N-dimethylformamide. 37.5 g. of ethylene bromide are then added. The product is isolated by pouring it into water and 36 g. of N-benzenesulphonyl-1:3-dithiacyclopentanone-(2)-imine M.P. 120° C. are obtained.

Example 13

24 cc. of sodium hydroxide (16 g. of NaOH in 20 cc. of water) and 13 cc. of carbon disulphide are added in portions to a solution of 31.5 g. of benzenesulphonamide in 200 cc. of N,N-dimethylformamide. 48.5 g. of allyl bromide are then added. The product is isolated by pouring it into water and 38.5 g. of N-benzenesulphonyl-iminodithiocarbonic acid-diallyl ester M.P. 60° C. are obtained.

Example 14

A solution of 22.5 g. of potassium hydroxide in 20 cc. of water and 13 cc. of carbon disulphide are added in portions to a solution of 31.5 g. of benzenesulphonamide in 200 cc. of N,N-dimethylformamide. 51 g. of benzyl chloride are then added.

The product is isolated by pouring it into water and 59 g. of N-benzenesulphonyl-imino-dithiocarbonic acid-dibenzyl ester M.P. 92° C. are obtained.

Example 15

24 cc. of sodium hydroxide (16 g. NaOH in 20 cc. water) and 13 cc. of carbon disulphide are added in portions to a solution of 38.5 g. of p-chlorobenzene-sulphonamide in 200 cc. of N,N-dimethylformamide. 51 g. of dimethyl sulphate are then added. When the product is isolated by pouring it into water, 29 g. of N-(p-chlorobenzene-sulphonyl)-imino-dithio-carbonic acid-dimethyl ester M.P. 93° C. are obtained.

Example 16

24 cc. of sodium hydroxide (16 g. NaOH in 20 cc. water) and 13 cc. of carbon disulphide are added in portions to a solution of 34.3 g. of p-toluenesulphonamide in 200 cc. of N,N-dimethylformamide. 49 g. of ethyl chloroacetate are then added. The product is isolated by pouring it into water and 55 g. of N-(p-toluenesulphonyl)-imino-dithiocarbonic acid-di-(carbethoxymethyl ester) M.P. 78° C. are obtained.

Example 17

24 cc. of sodium hydroxide (16 g. of NaOH in 20 cc. water) and 13 cc. of carbon disulphide are added in portions to a solution of 34.3 g. of p-toluenesulphonamide in 200 cc. of N,N-dimethylformamide. 37 g. of chloroacetone are then added. When the product is isolated by pouring into water, 46 g. of N-(p-toluenesulphonyl)-imino-dithiocarbonic acid-diacetonyl ester M.P. 105° C. are obtained.

Example 18

24 cc. of sodium hydroxide (16 g. of NaOH in 20 cc. of water) and 13 cc. of carbon disulphide are added in portions to a solution of 31.5 g. of benzene sulphonamide in 200 cc. of N,N-dimethylformamide. 25.5 g. of dimethyl sulphate are then added. When the product is isolated by pouring into water and acidifying with 20 to 25 cc. of concentrated hydrochloric acid, a yellowish product is obtained which is sometimes an oil at first but solidifies to form crystals after some time. It is filtered by suction, and after drying it is recrystallized from benzene. 32.5 g. of N-benzenesulphonyl-dithiocarbaminic acid methyl ester M.P. 142° C. are obtained.

Example 19

24 cc. of sodium hydroxide (16 g. of NaOH in 20 cc. of water) and 13 cc. of carbon disulphide are added in portions to a solution of 31.5 g. of benzene sulphonamide in 200 cc. of N,N-dimethylformamide. 31 g. of diethyl sulphate are then added. When the product is isolated by pouring into water and acidifying, 41 g. of N-benzenesulphonyl-dithiocarbaminic acid ethyl ester M.P. 121° C. are obtained.

Example 20

24 cc. of sodium hydroxide (16 g. of NaOH in 20 cc. of water) and 13 cc. of carbon disulphide are added in portions to a solution of 31.5 g. of benzene sulphonamide in 200 cc. of N,N-dimethylformamide. 27.5 g. of n-butyl bromide are then added. When the product is isolated by pouring into water and acidifying, 40 g. of N-benzenesulphonyl-dithiocarbaminic acid-n-butyl ester M.P. 102° C. are obtained.

Example 21

24 cc. of sodium hydroxide (16 g. of NaOH in 20 cc. of water) and 13 cc. of carbon disulphide are added in portions to a solution of 34.3 g. of p-toluenesulphonamide in 200 cc. of N,N-dimethylformamide. 25.5 g. of dimethyl sulphate are then added. When the product is isolated by pouring into water and acidifying, 37 g. of N-(p-toluenesulphonyl)-dithio-carbaminic acid-methyl ester M.P. 135° C. are obtained.

Example 22

85 cc. of N-sodium hydroxide are added dropwise to a solution of 168 g. of 3-nitrobenzene sulfonamide in 600 cc. of dimethylsulfoxide at 20 to 30° C., then 50 cc. of carbondisulfide and then another 85 cc. of N-sodium hydroxide are added.

After stirring for another half hour 170 cc. of dimethylsulfate are added and the mixture is heated to 90° C. for one hour. The reaction product is then precipitated with 2 l. of water and washed with water and cold methanol. There are obtained 160 g. of a compound of the formula

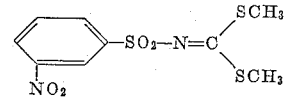

which melts at 135 to 137° C.

Example 23

136 cc. of N-sodium hydroxide, 81 cc. carbon disulfide and another 136 cc. of N-sodium hydroxide are added consecutively drop by drop to a solution of 232 g. of o-toluenesulfonamide in 800 cc. dimethylformamide. The mixture is stirred for half an hour at room temperature and 280 cc. of dimethylsulfate are added. After stirring for another hour at 90 to 100° C. the mixture is poured into 3 l. of water and the precipitated product is washed with cold methanol.

There are obtained 267 g. of a compound of the formula

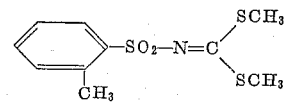

which melts at 112 to 113° C.

We claim:

1. Benzene - sulphimino - thiocarbonic acid dimethylester.
2. Benzene-sulphimino-thiocarbonic acid dibenzylester.
3. N-acetyl-sulphanyl-iminothiocarbonic acid dimethylester.
4. N-benzene-sulphonyl - 1,3 - dithia - cyclopentanone-(2)-imine.
5. Dimethylamino-sulphonylimino - dithiocarbonic acid dibenzylester.
6. Benzene-sulphonylimino-dithiocarbaminic acid butylester.
7. N-(p-toluol-sulphonyl)-imino-dithiocarbaminic acid methylester.

8. A process according to claim 15, wherein the primary sulphonamide is used in the form of its alkali salt.

9. A process according to claim 15, wherein the primary sulphonamide is used in the form of its amine salt.

10. A process according to claim 15, wherein the alkylating agent is a member of the group consisting of dimethylsulphate, diethylsulphate, ethylbromide, n-butylbromide, benzylchloride, 4-chlorobenzylchloride, ethylene bromide, chloroacetic acid ethyl ester and chloroacetone.

11. A process according to claim 15, wherein the basic compound is a member of the group consisting of an alkali metal hydroxide, an alkaline earth metal hydroxide and a tertiary organic base.

12. A process according to claim 15, wherein the inert medium is a member of the group consisting of dimethylformamide, acetonitrile, benzene, toluene, chlorobenzene, dimethylformamide, dimethylsulphoxide, diethylether, dioxane and tetrahydrofurane.

13. A sulphonylimino-dithiocarbonic acid ester having the formula

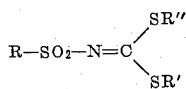

wherein R is a member of the group consisting of lower alkyl, phenyl, lower alkyl phenyl, chlorophenyl, nitrophenyl, p-acetanilide, and di-lower alkyl amino, R' is a member of the group consisting of lower alkyl, lower alkenyl, lower alkylphenyl, lower alkyl chlorophenyl, ethoxyethyl and acetonyl, R'' is a member of the group consisting of hydrogen, lower alkyl, lower alkenyl, lower alkylphenyl, lower alkylchlorophenyl, ethoxyethyl, and acetonyl, and wherein R' and R'' may represent a polymethylene chain having 2 carbon atoms.

14. A sulphonylimino-di-thiocarbonic acid ester having the formula

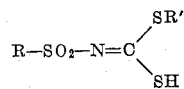

wherein R is a member of the group consisting of lower alkyl, phenyl, lower alkylphenyl, chlorophenyl, nitrophenyl, p-acetanilide, and di-lower alkyl amino, and R' is a member of the group consisting of lower alkenyl, lower alkylphenyl, lower alkylchlorophenyl, ethoxyethyl, and acetonyl.

15. A process for preparing sulphonylimino di-thiocarbamic acid esters having the formula

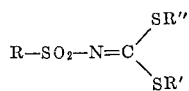

wherein R is a member of the group consisting of lower alkyl, phenyl, lower alkyl phenyl, chlorophenyl, nitrophenyl, p-acetanilide, and di-lower alkyl amino, R' is a member of the group consisting of lower alkyl, lower alkenyl, lower alkylphenyl, lower alkylchlorophenyl, ethoxyethyl, and acetonyl, R'' is a member of the group consisting of hydrogen, lower alkyl, lower alkenyl, lower alkylphenyl, lower alkylchlorophenyl, ethoxyethyl, and acetonyl, and wherein R' and R'' may represent a polymethylene chain, which comprises in a first step reacting at a temperature of 0 to 50° C. in an inert organic medium a primary sulphonamide selected from the group consisting of methane sulphonamide, N,N-di-methylamino sulphonamide, N-acetyl sulphonylamide, benzenesulphamide, p-chloro-benzene-sulphonamide, and N-(p-toluene)-sulphonamide with carbon disulphide in the presence of a basic compound to form the corresponding N-sulphonyl-dithiocarbamic acid and in a second step reacting the latter with an alkylating agent at a temperature of 0° to 150° C. in the same inert organic medium to form the sulphonylimino dithiocarbamic acid ester.

16. Benzene-sulphimino-thiocarbonic acid-dibutyl ester.

17. Benzene - sulphimino - thiocarbonic acid-di-chlorobenzylester.

18. N-(p-toluene sulphonyl)-imino-di-thiocarbonic acid dimethyl ester.

19. N-benzene sulphonyl-imino-di-thiocarbonic acid-di-allylester.

20. N - (p-toluene sulphonyl) - imino-di - thiocarbonic acid-di-(carbethoxy methyl ester).

21. N-(p-toluene sulphonyl) - imino - di - thiocarbonic acid-di-acetonylester.

References Cited

Chemical Abstracts, volume 41, column 3340b (1947), QD 1 A51 (abstract of Saccardi).

Houben-Weyl, Methoden der Organischen Chemie, 4th edition, volume 9, page 849, Georg Thieme Verag, Stuttgart, Germany (1955).

Kreutzkamp, Naturwissenschaften, vol. 50, page 474, June 1963.

JOHN D. RANDOLPH, *Primary Examiner.*